Patented Mar. 30, 1926.

1,578,875

UNITED STATES PATENT OFFICE.

WILLIAM B. WIEGAND, OF MONTREAL, QUEBEC, CANADA.

RUBBER COMPOSITION AND METHOD OF MAKING THE SAME.

No Drawing.   Application filed June 16, 1922. Serial No. 568,886.

*To all whom it may concern:*

Be it known that I, WILLIAM BRYAN WIEGAND, of the city of Montreal, in the Province of Quebec, Dominion of Canada, a subject of the King of Great Britain, have invented certain new and useful Improvements in Rubber Composition and Methods of Making the Same; and I do hereby declare that the following is a full, clear, and exact description thereof.

My invention consists in a new article of rubber manufacture and a process for producing the same.

Briefly, the new article is a composition of vulcanized rubber possessing semi-rigidity combined with great extensibility and tensile strength, together with certain means of achieving this combination of properties.

This new article finds a distinctly novel and valuable application in the manufacture of leather-like parts of all sorts, such, for example, as the soles of shoes. Also, it has already found new and important applications, as when used as the lining or inner layer of rubber footwear of all kinds, being in this respect a satisfactory and inexpensive substitute for woven or knitted fabric as commonly used in the art. The new substance is also applicable to divers uses such as travelling bags, flooring, shock absorbers, etc.

The rubber compositions commonly used in the art may be divided into two broad classes; soft rubber compositions on the one hand, such as, for example, are used in rubber bands, hose, overshoes, tire treads, etc.; and hard rubber compositions, also called ebonite, such as are used for battery jars, combs, telephone parts, etc.

Now the former class possess high extensibility with low rigidity, and the latter great rigidity accompanied by very low extensibility. These limitations confine the usefulness of these two classes of substances to a certain range of applications, as is well-known in the art.

It has for some years been recognized that there was a more urgent need for a third class of rubber compositions, viz; one which might unite the extensibility and therefore immunity from fracture of the former class with the firmness or rigidity of the latter class.

Various attempts have been made to achieve such a composition, chiefly with a view to the production of a so-called imitation leather soling material which might replace leather for use in the outsoles of leather and other footwear.

The results of all these attempts have been only partially successful. A sufficient degree of rigidity has, it is true, been frequently achieved, but in every case there has been so serious a sacrifice in extensibility and also in strength as to incur the danger of early failure due to cracking, chipping, or to what is in the art termed "bad aging quality".

In order clearly to define the class of rubber compositions which is contemplated in this invention, I shall indicate the scope of the various physical properties which I have successfully produced and which I verily believe to constitute a distinctly novel invention.

The semi-rigidity to which I have referred may be defined as a degree of stiffness or resistance to deformation such that to stretch a piece of the vulcanized product to twice its original length requires a force equal to from say 670 to 1600 lbs. per square inch of original cross section. This degree of rigidity embodies the requisite "feel" and stiffness desired in a composition designed for use for example, as a leather-like sole for a shoe.

Now my invention contemplates a product or composition which in addition to displaying the above-mentioned degree of rigidity or stiffness, is nevertheless capable of being stretched to four, five or even six times its original length before rupturing, and also develops when stressed to rupture a final tensile strength ranging from 3500 to 4500 lbs. per square inch of original cross section.

This high extensibility combined with high final (or breaking) strength, ensures for this composition a resistance to wear and tear, and a freedom from premature failure which I believe to be new and hitherto unattained in the art.

I repeat that in the art there have been produced rubber compositions exhibiting the degree of rigidity described above, but these compositions have lacked the degree of strength and extensibility indicated in the specific examples referred to, and I shall now describe the means used in the past and the new process constituting my invention.

In the present art this increased rigidity has been secured through the admixture with the rubber of coarse, fibrous matter of various kinds. In most cases ground cotton or wool waste has been used for this purpose. In other cases ground leather or cork has been chosen. In still other cases substances such as china clay have been used, in this case the well known fibrous or acicular character of the crystals being the agency through which the desired rigidity is obtained.

Now my invention contemplates a totally distinct and different means of securing the desired rigidity and combining with it the new properties of strength and extensibility.

I choose the very finest and least fibrous materials known to the art, and admix these in definite proportions with the rubber and vulcanizing agents which are always used to ensure a satisfactory degree of vulcanization.

These agents are by no means new in the art. The most approved materials I have so far used are for example, carbon gas black and lampblack. These chemicals are in daily use in the art as coloring and strengthening ingredients in the manufacture of soft rubber goods referred to above; but are used in only comparatively small percentages of the crude rubber and therefore do not obtain the combined qualities of high extensibility high rigidity, and high tensile strength at rupture.

The present invention contemplates the use of these ingredients in relatively high percentages of the crude rubber, covering an approximate range of from 60 to 100 parts of carbon gas black or lampblack to each 100 parts by weight of the crude rubber.

As a typical case I add to each 100 parts by weight of crude rubber, 80 parts by weight of carbon or gas black and a sufficient quantity of sulphur and litharge to achieve the desired degree of vulcanization of the product. This when vulcanized produces a product combining relatively high rigidity with high extensibility and breaking strength.

I may use only 60 parts or I may use 100 parts and secure in each case, in varying proportion, the qualities desired.

In some cases I use combinations of carbon or lamp black with other and coarser fillers such as carbonate of magnesium or zinc oxide, etc. But in each case I use a comparatively high percentage of the highly pulverulent carbon or lampblack.

Rubber footwear of all kinds, including low overshoes as commonly worn over leather footwear, and also heavy boots of all heights as worn over leather footwear, and also heavy boots of all heights as worn over the stocking by miners, farmers, fishermen, etc., may be made according to my invention, the effect being that for the first time an article of rubber footwear consisting integrally of rubber compound throughout is produced.

Heretofore all articles of footwear have been furnished with a woven or knitted fabric lining, made sometimes of cotton, sometimes of wool, sometimes of mixtures of the two; and the common method of manufacturing footwear has been to subject this fabric lining to several rubberizing processes, either by means of a so-called spreading machine or on a calender, after which it is cut to pattern and the various pieces applied by hand in the manner well-known to the art.

The object of my invention is accomplished by eliminating this fabric lining and using instead a lining of rubber composition to reduce the difficulties and number of the rubberizing processes referred to above as well as the cost of manufacture. This is also achieved by reason of the fact that rubber composition always costs less than woven or knitted fabric, because of the greater simplicity of its preparation. Again, I achieve a further and important economy by virtue of the fact that whereas the cuttings or waste material left over when the fabric lining have been cut to pattern are, practically speaking, useless, and no longer available for their original purpose. The cuttings left over when the linings are cut from my rubber composition are in a soft and plastic condition, and can be readily worked up and used again, just as if they were a freshly prepared compound.

In conclusion I would say that the novel effects which I have secured are due to the use of high percentages of carbon gas black and lampblack calculated to the amount of crude rubber present. I do not limit myself to the two substances known as carbon and lampblack, because any other substance or substances as finely divided may be employed without departing from the spirit of my invention.

Furthermore to meet certain requirements other equally fine or finer pigments may be employed with slightly less or more than the proportions mentioned within the spirit of my invention.

What I claim is as follows:

1. The process of treating rubber with from sixty (60) to one hundred (100) parts by weight of carbon or lamp black to each one hundred (100) parts by weight of crude rubber together with the necessary vulcanizing agents.

2. An article of rubber composition containing 60 to 100 parts by weight of carbon or lamp black, to 100 parts crude rubber.

3. An article of footwear including sole and upper portions and consisting of rubber compound containing as an essential ingredient between fifty (50) and one hundred (100) parts by weight of carbon black to each one hundred (100) parts of rubber in the compound.

In testimony whereof I have signed my name to this specification.

WILLIAM B. WIEGAND.